Inventors:
PHILLIPS B. SCOTT &
LAWRENCE P. WENNIK
John T. O'Halloran
Attorney

Inventors:
PHILLIPS B. SCOTT &
LAWRENCE P. WENNIK
John T. O'Halloran
Attorney

United States Patent Office 3,476,954
Patented Nov. 4, 1969

3,476,954
ELECTRICAL NEURON CIRCUIT THAT INCLUDES AN OPERATIONAL AMPLIFIER

Lawrence Paul Wennik, Philadelphia, Pa., and Phillips Brooks Scott, Haddonfield, N.J., assignors to RCA Corporation, a corporation of Delaware Filed Aug. 23, 1966, Ser. No. 574,446
Int. Cl. H03k *19/08, 19/12;* G06g *7/12*
U.S. Cl. 307—201 5 Claims

ABSTRACT OF THE DISCLOSURE

An electrical neuron circuit includes an operational amplifier and simulates the transfer characteristic of a biological neuron. The operational amplifier is biased to establish a predetermined threshold point for input signals below which no output signals are produced. The operational amplifier exhibits a high gain that produces a digital step in the output signal upon conduction at the threshold point. A feedback network is coupled to degeneratively feedback the output signals of the operational amplifier to the input thereof to reduce the gain of the amplifier. The operational amplifier thereupon exhibits an analog increase in output signals for increasing values of input signals up to saturation after which the output remains substantially constant.

Figure 1:
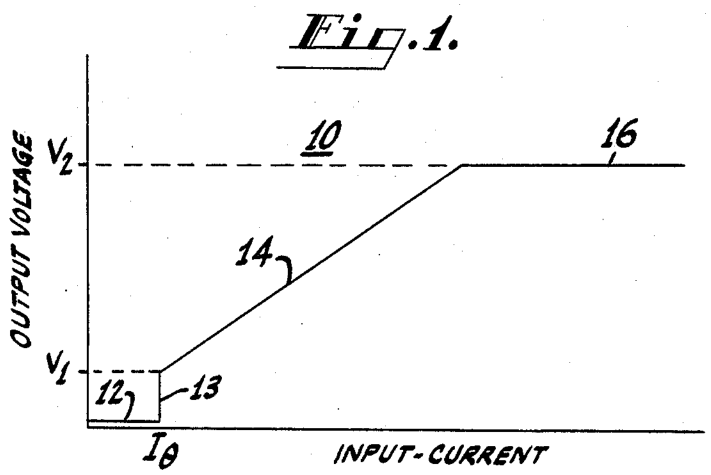

The basic building blocks of the biological nervous system are neurons. Biological neurons receive stimuli in the form of electrical input pulses from other biological neurons or from receptor sense organs, such as the eye, the ear, etc., and respond to certain input stimuli by generating electrical output pulses by means of a complex electrochemical process.

According to the present understanding, biological neurons receive excitatory and inhibitory input pulses of standard width and amplitude. Excitatory input pulses tend to activate, or "fire," a biological neuron whereas inhibitory input pulses tend to inhibit the activation of a neuron. It is believed that the excitatory and inhibitory input pulses are algebraically added together and that the sums of the two types of pulses are then integrated to provide a resultant pulseless or direct input signal to the biological neuron. When such a resultant input signal exceeds a predetermined threshold value, the biological neuron is activated and produces a pulse output. The number of firings or output pulses produced is a function of the intensity or amplitude of the direct input signal as well as the characteristics of the biological neuron itself. The number of firings in a given time interval increases as the intensity of the input signal increases up to a maximum or saturation point after which the firing rate remains constant. Saturation occurs because the electrochemical processes producing the pulses require a refractory period, i.e., a recuperative period, between pulses.

The paths interconnecting biological neurons in the human body sometimes exhibit extremely high impedances—higher than $10^{13}$ ohms in some instances. It is believed that biological neurons transmit different stimuli, i.e., information signals, by pulses of differing frequencies so as to avoid the difficulty of having to accurately transmit small amplitude direct signals over such high impedance paths. Electrical circuits designed to simulate the operation of biological neurons need not be interconnected by such high impedance paths. Consequently, such electrical neurons need not produce a pulse output to transmit desired information to succeeding electrical neurons. Additionally, since integration occurs at the input to a biological neuron, an individual biological neuron effectively responds to a direct input signal rather than a pulse input signal. Therefore, electrical neurons can effectively simulate the important functions of biological neurons by operating on direct currents without utilizing either input or output pulses. Such a pulseless neuron has been heretofore disclosed in Patent No. 3,394,266 entitled, Direct Current Electrical Neuron Circuit for Thomas B. Martin and Ellwood P. McGrogan, Jr., and assigned to the same assignee as the present application.

It is an object of this invention to provide an improved pulseless electrical neuron that effectively simulates the desired operation of a biological neuron.

It is another object of this invention to provide an improved pulseless threshold circuit of the electrical neuron type that effectively simulates the desired operation of a biological neuron and which is substantially immune to ambient temperature variations.

A threshold circuit embodying the invention simulates a biological neuron by exhibiting an input-output transfer characteristic that includes a region of substantially zero output for low values of input signals below a predetermined threshold point; an abrupt digital step increase in output to a first value at said threshold point; a region having an analog increase in output from said first value to a saturation value for intermediate values of input signals; and a region of substantially constant output of said saturation value for high values of input signals greater than said intermediate values.

The threshold circuit includes an amplifier having input terminals for receiving input signals applied thereto and an output terminal for providing amplified output signals. Biasing means are coupled to the amplifier for establishing the predetermined point for input signals below which substantially no output signals are produced. The amplifier may, for example, be an operational amplifier exhibiting high gain for producing a digital step increase in output to a first value for an input signal of said threshold value. A feedback network is coupled from the output to the input terminals of said amplifier to degeneratively feedback said output signals to reduce the gain of the amplifier to provide an analog increase in output from said first value up to a saturation value for increasing values of input signals above said threshold point. The amplifier saturates at high values of input signals to provide a substantially constant output.

Figure 2:
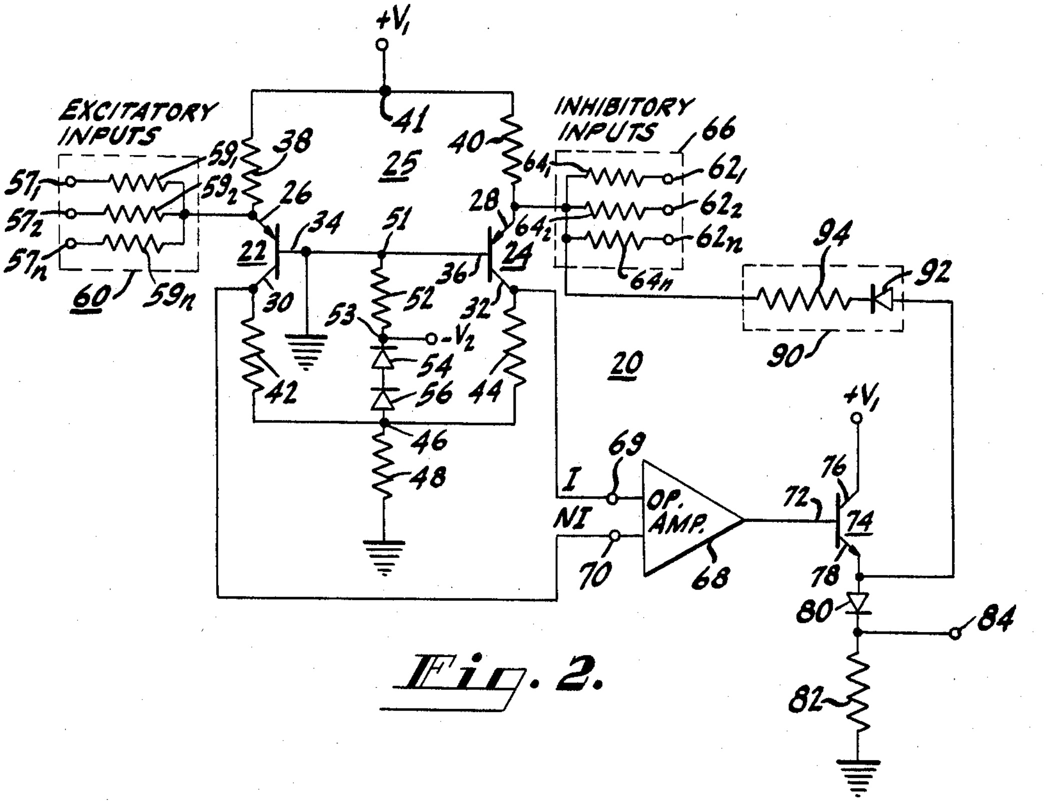
Figure 3:
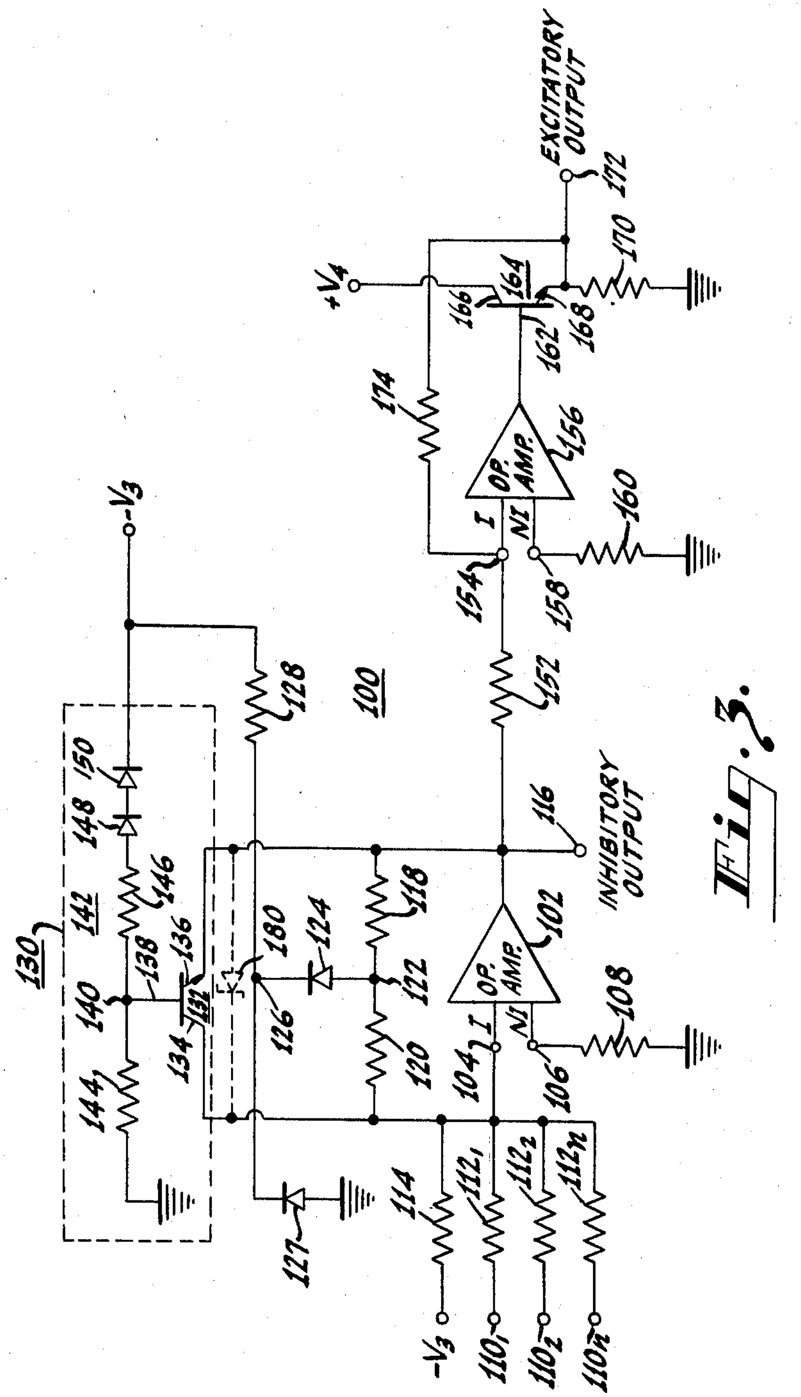

In the drawings:

FIGURE 1 is the current-voltage transfer characteristic of an electrical circuit that simulates a biological neuron; and FIGURES 2 and 3 are schematic circuit diagrams of different embodiments of threshold circuits that exhibit the transfer characteristic of FIGURE 1.

Referring now to FIGURE 1, there is illustrated a graph showing the input-output transfer characteristic 10 of a threshold circuit in accordance with the invention. The characteristic curve 10 of FIGURE 1 substantially duplicates the transfer characteristic of a biological neuron. The characteristic curve 10 exhibits a region 12 of substantially zero output voltage for low values of input current below a threshold point $I_\theta$. At the threshold point $I_\theta$, the characteristic curve exhibits an abrupt or digital step 13 increase in output voltage up to a first output voltage value $V_1$. Thus, the curve 10 exhibits digital characteristics in that below the threshold point $I_\theta$ substantially no output is produced whereas at this point a significant output voltage is produced. Such a digital step increase reduces the chances of noise or drift triggering an electrical neuron, corresponding to the ability of biological neurons to ignore inconsequential stimuli. The curve 10 exhibits a region 14 of continuous increase in output voltage for increasing intermediate values of input current. The region 14 is considered to be an analog region as contrasted to a digital step since for every value of output voltage there exists a different value of input current. Although FIGURE 1 shows a linear analog increase, because the threshold circuit to be described includes a linear amplifier, it is to be noted that the increase in the analog portion 14 may also be logarithmic. The output voltage in the portion 14 increases up to a maximum saturation point or second voltage level $V_2$ after which the curve 10 exhibits a substantially constant output voltage region 16 at the saturation level for relatively high and increasing values of input current. The characteristic curve 10 substantially duplicates the functional transfer characteristic of biological neurons.

In FIGURE 2 there is shown a schematic circuit diagram of one embodiment of a threshold circuit that exhibits the transfer characteristic shown in FIGURE 1. The threshold circuit 20 of FIGURE 2 includes a pair of matched transistors 22 and 24. The transistors 22 and 24, which are shown as PNP type transistors, include respectively, emitters 26 and 28, collectors 30 and 32 and bases 34 and 36. The transistors 22 and 24 are connected as a circuit 25. The emitters 26 and 28 are respectively coupled through resistors 38 and 40 to a junction point 41. The collectors 30 and 32 are coupled through resistors 42 and 44 respectively to a junction point 46 that is in turn coupled through a resistor 48 to a point of reference potential or ground in the circuit 20. The bases 34 and 36 are connected together at a junction point 51 and the junction point 51 is connected to circuit ground. Thus the transistors 22 and 24 operate in the grounded base configuration. The junction point 51 is also coupled through a resistor 52 and a pair of diodes 54 and 56 to the junction point 46. The diodes 54 and 56 are poled in the same direction and present a path of easy current flow from the junction point 46 to the junction point 51. The connection of the cathode of the diode 54 to the resistor 52 comprises a junction point 53.

The circuit 25 comprises a network for algebraically summing excitatory and inhibitory signals applied thereto. The excitatory input signals are applied through input terminals $57_1$, $57_2$ . . . $57_n$, which terminals are coupled respectively through resistors $59_1$, $59_2$ . . . $59_n$ to the emitter electrode 26 of the first transistor 22. The parallel resistors $59_1$ through $59_n$ comprise a resistor network 60 that linearly combines the excitatory input signals applied to the input terminals. The inhibitory input signals are applied to input terminals $62_1$, $62_2$ . . . $62_n$ and through resistors $64_1$, $64_2$ . . . $64_n$ respectively to the emitter electrode 28 of the junction transistor 24. The parallel resistor $62_1$ through $62_n$ comprise a resistive network 66 that sums the inhibitory input signals applied to the input terminals $62_1$ . . . $62_n$. The circuit 25 is biased by connecting the junction point 41 to a source of positive potential $+V_1$ and the junction point 53 to a source of negative potential $-V_2$. The resistor 40 is made smaller than the resistor 38 so that the initial threshold region 12 of the transfer characteristic 10 of FGURE 1 is produced, as will be described in more detail subsequently.

The circuit 25 is coupled to an operational amplifier 68 to provide the initial digital step 13 in the transfer characteristic of FIGURE 1. The operational amplifier 68 includes an inverting (I) input terminal 69 and a non-inverting (NI) input terminal 70. The operational amplifier may for example comprise an RCA Operational Amplifier as disclosed in a publication entitled, "RCA–CA3008, CA3010, Linear Integrated Circuits, Operational Amplifier Types, Monolithic Silicon." Such an amplifier exhibits a high gain when operated "open loop," i.e., with no negative feedback. The operational amplifier 68 inverts an input signal applied to the inverting terminal 69 but does not invert an input signal applied to the non-inverting terminal 70. The output of the operational amplifier 68 is coupled to the base electrode 72 of an emitter-follower transistor 74. The transistor 74 also includes a collector 76 coupled directly to the source of positive potential $+V_1$ and an emitter 78 coupled through a temperature compensating diode 80 and a resistor 82 to circuit ground. The emitter 78 is connected directly to the anode of the diode 80 whereas the cathode thereof is connected to an output terminal 84 for the threshold circuit 20.

The emitter 78 of the output transistor 74 is also coupled through a feedback network 90 to the inhibitory transistor 24 of the circuit 25. The feedback network 90 includes a nonlinear impedance that exhibits a threshold, such as a diode 92. The network 90 also includes a resistor 94 serially connected to the diode 92. The diode 92 is poled such that the anode thereof is directly connected to the emitter 78 of the output transistor 74.

The threshold circuit, without the biasing supplies $V_1$ and $V_2$, may comprise an article of manufacture in integrated circuit module form. In fact, an array of threshold circuits may be fabricated on a single chip of semiconductor material and interconnected to perform various logical functions required by a particular system. Additionally, the threshold circuit may be fabricated with discrete components.

In operation, the threshold circuit 20 produces a transfer characteristic, such as that shown in FIGURE 1, and also exhibits the added advantage of being substantially immune to ambient temperature changes. Quiescently, the selection of the resistor 40 to be smaller than the resistor 38 causes more current from the biasing source to steer through the inhibitory transistor 24 than through the excitatory transistor 22 of the circuit 25. The output of the inhibitory transistor 24 is applied to the inverting terminal 69 of the operational amplifier 68. The operational amplifier 68 provides a negative signal to the output transistor 74 which biases this transistor so that it is cut off. Consequently, no output signal is provided at the output terminal 84. Similarly, for low values of excitatory input signals, no output is produced by the threshold circuit 20 and consequently the intial region 12 of FIGURE 1 is produced. When the excitatory input signals exceed the inhibitory signals, the excitatory transistor 22 applies more current to the non-inverting terminal 70 of the operational amplifier 68 than the inhibitory transistor 24 applies to the inverting terminal 69 of the operational amplifier 68. The output transistor 74 is therefore biased to conduction. The high gain of the operational amplifier 68 causes the output to exhibit the digital step 13 of FIGURE 1. No feedback is produced until the output signal from the transistor 74 exceeds the threshold of the diode 92. When the output signal causes the diode 92 to operate in its low impedance region, a feedback signal is applied to the inhibitory transistor 24 through the diode 92. The feedback signal is an inhibitory signal and consequently the feedback is negative or degenerative feedback. Such a negative feedback signal reduces the overall gain of the threshold circuit 20. This reduction in the overall gain creates the substantially linearly increasing portion 14 of the transfer characteristics 10 in FIGURE 1. This portion 14 is termed an analog portion in this specification to distinguish it from the step or digital portion 13 of the characteristic 10 of FIGURE 1. As the excitatory input signals are increased further the analog threshold circuit 20 saturates to produce the substantially constant output portion 16 of the characteristic 10.

The threshold circuit 20 not only effectively simulates the important functions of a biological neuron but also exhibits desirable electrical circuit characteristics. Temperature stability is provided by the negative feedback in the analog region of operation. Furthermore, the threshold circuit 20 also exhibits a low input impedance due to the grounded base operation of the input transistors 22 and 24. Such a low input impedance permits the input signals to be linearly summed by the input resistive networks.

In FIGURE 3, there is shown another embodiment of a threshold circuit 100 that exhibits the transfer characteristic shown in FIGURE 1. The threshold circuit 100 includes a first operational amplifier 102 of the type previously described. The operational amplifier 102 includes an inverting (I) input terminal 104 and a non-inverting (NI) input terminal 106. The non-inverting terminal 106 is coupled through a resistor 108 to circuit ground whereas the inverting terminal 102 of this amplifier is the input summing terminal for the threshold circuit 100. A plurality of input terminals $110_1$, $110_2$ . . . $110_n$ are coupled respectively through parallel resistors $112_1$, $112_2$ . . . $112_n$ to the inverting terminal 104 of the operational amplifier 102. Additionally, a negative bias is applied from a negative potential source $-V_3$ through a resistor 114 to the inverting terminal 104 of the amplifier 102. The output of the operational amplifier 102 provides the inhibitory output of the threshold circuit 100 and is derived from an output terminal 116 of the amplifier 102.

A feedback circuit path is provided by coupling the output terminal 116 through a pair of serially connected resistors 118 and 120 back to the inverting terminal 104 of the amplifier 102. The junction 122 of the resistors 118 and 120 is coupled through a forwardly poled diode 124 to a second junction point 126. A second diode 127 is coupled from circuit ground to the junction point 126 and is forwardly poled to maintain the junction point 126 below ground level. A resistor 128 is connected from the junction point 126 to the negative potential terminal of a power supply $-V_3$.

A saturation circuit 130 is included in the threshold circuit 100. The circuit 130 includes a transistor 132 having a collector 134 and an emitter 136, each coupled to one terminal of the voltage divider resistors 118 and 120. The base 138 of the transistor 132 is biased by coupling to a junction point 140 of a voltage divider 142. The voltage divider 142 includes a resistor 144 coupled from circuit ground to the junction 140 and the serial combination of a resistor 146 and a pair of diodes 148 and 150 coupled from the junction point 140 to the source of negative potential $-V_3$. The diodes 148 and 150 are connected to be forwardly poled from the junction 140 to the source of negative potential $-V_3$ and function as temperature compensating diodes.

The first operational amplifier 102 is coupled through a resistor 152 to the inverting (I) input terminal 154 of a second operational amplifier 156. The non-inverting (NI) input terminal 158 of the second operational amplifier is coupled through a resistor 160 to circuit ground. The output of the second operational amplifier 156 is coupled to the base electrode 162 of an output emitter-follower transistor 164. The transistor 164 includes a collector 166 directly connected to a source of positive potential $+V_4$ and an emitter 168 coupled through a resistor 170 to circuit ground. An output terminal 172 is directly connected to the emitter 168 and comprises the excitatory output for the threshold circuit 100. The output terminal 172 is also coupled through a resistor 174 back to the inverting input terminal 154 of the second operational amplifier 156.

In operation both excitatory and inhibitory input terminals of positive and negative polarity respectively are applied to the input terminals $110_1$ . . . $110_n$ of the threshold circuit 100. The input resistors $112_1$ . . . $112_n$ algebraically add the opposite polarity input signals to apply a positive input signal to the first operational amplifier 102 when the positive excitatory input signals exceed the negative inhibitory input signals as well as a threshold established by the potential source $-V_3$. Consequently, the first initial region 12 in FIGURE 1 in the threshold circuit transfer characteristic is provided by negatively biasing the operational amplifier 102. The operational amplifier 102, by having its non-inverting input terminal 106 connected to ground and by having input signals applied to the inverting terminal 104, exhibits a low input impedance so that the resistor network $112_1$ . . . $112_n$ provides a linear and algebraic summation of the positive and negative input signals applied to the input terminals $110_1$ . . . $110_n$. When the positive excitatory input signals exceed the negative inhibitory input signals and the negative bias, the operational amplifier 102 produces a negative step output signal. The negative step output signal is inverted in the second operational amplifier 156 to produce the digital step increase 13 as shown in FIGURE 1 from the excitatory output terminal 172.

No feedback is produced through the resistor network 118 and 120 because the diode 124 is forward biased to conduct by the negative supply $-V_3$. The cathode of the diode 124 is clamped to substantially a one diode voltage drop below ground due to the forward conduction of the second diode 127. While the diode 124 is forward biased, all of the output signal from the operational amplifier 102 is shunted through the diode and none is applied to the input terminal 104. When the negative output signal from the inhibitory output terminal 116 of the operational amplifier 102 is sufficiently negative to back bias the diode 124, this diode cuts off and the negative output signals are fed back to the inverting input terminal 104 of the operational amplifier 102. Since the feedback signal is negative, degenerative or negative feedback occurs. The negative feedback decreases the high gain of the amplifier 102 and an analog increase in output occurs for further increases in excitatory input signals, such as shown by the region 14 in FIGURE 1.

When the input signal increases sufficiently to drive the operational amplifier 102 to the point of saturation, the shunt network 130 operates to shunt the input signal around the operational amplifier 102. The transistor 132 is normally nonconductive due to the negative biasing of the base 138 thereof. However, as the output of the operational amplifier increases in absolute magnitude, the inhibitory output terminal 116 goes more negative and consequently the emitter 136 of the transistor 132 becomes more negative than the base thereof. The bias of this transistor is such that, at the saturation, voltage $V_2$, the base-emitter junction becomes forward biased and a low impedance shunting of the amplifier 102 occurs. The output of the circuit 100 therefore remains substantially constant, simulating the region 16 of the transfer characteristic 10 of FIGURE 1.

The reason for including the transistor 132 shunt network is to prevent the amplifier 102 from exhibiting a high impedance at saturation. Therefore it is to be noted that other devices can be substituted to duplicate the operation of the transistor 132. For example, a Zener diode 180 (shown in dotted form in FIGURE 3) may be substituted for the network 130 and poled to conduct in its reverse breakdown characteristic from the input terminal 104 to the output terminal 116.

Thus a threshold circuit embodying the invention simulates the major functions of a biological neuron. One embodiment of the invention is adapted to receive excitatory and inhibitory input signals of the same polarity to produce single polarity output signals. Another embodiment of the invention is adapted to receive excitatory and inhibitory input signals of opposite polarity to produce both negative and positive output signals. Each embodiment is substantially immune to temperature variations due to its circuit configuration. Additionally, by making the circuits into integrated circuit modules, the temperature stability is enhanced. Each embodiment exhibits desirably low input and output impedances.

What is claimed is:

1. A threshold circuit having an input-output characteristic exhibiting an output that is substantially zero for low values of input below a predetermined threshold point, an output that includes an analog increase up to a maximum saturation value for intermediate values of input greater than said threshold value, and an output that is substantially constant at said saturation value for high values of input, comprising in combination, an operational amplifier having an inverting input terminal, a non-inverting input terminal and an output terminal, means for coupling said non-inverting input terminal to a point of reference potential, an input network coupled to said inverting input terminal, means for applying to said input network excitatory and inhibitory input signals to provide a resultant input signal to said inverting input terminal when said excitatory input signals exceed said inhibitory input signals so as to produce an inverted output signal from said output terminal, an inverter coupled to said output terminal of said operational amplifier to re-invert said output signal to provide said output of said threshold circuit, means for biasing said operational amplifier for establishing said predetermined threshold point for resultant input signals below which substantially no output is produced, said amplifier exhibiting high gain for producing a digital step in output at said predetermined threshold point, and feedback means for coupling said output terminal of said operational amplifier to said inverting input terminal via said input network to provide degenerative feedback to reduce the gain of said operational amplifier to provide said analog increase in output for increasing resultant input signals above said threshold point, said amplifier saturating at high values of resultant input signals to provide said substantially constant output.

2. A threshold circuit in accordance with claim 1 wherein said feedback means includes a nonlinear impedance exhibiting a high impedance for applied signals below a threshold value and a low impedance for applied signals above a threshold value so that low values of feedback signals are blocked by said nonlinear impedance.

3. A threshold circuit in accordance with claim 2 wherein said nonlinear impedance comprises a diode.

4. A threshold circuit in accordance with claim 1 wherein said input network includes a summing network for algebraically summing input signals for applying a resultant summed signal to said operational amplifier.

5. A threshold circuit in accordance with claim 4 wherein said summing network comprises a parallel resistive network coupled to said input terminals of said amplifier to algebraically add excitatory and inhibitory input signals of opposite polarity.

References Cited

UNITED STATES PATENTS

| | | | |
|---|---|---|---|
| 3,144,564 | 8/1964 | Sikorra | 307—229 |
| 3,394,266 | 7/1968 | Martin et al. | 307—201 |

JOHN S. HEYMAN, Primary Examiner

S. D. MILLER, Assistant Examiner

U.S. Cl. X.R.

307—229, 230; 328—142